(12) United States Patent
Lindström et al.

(10) Patent No.: US 10,604,142 B2
(45) Date of Patent: Mar. 31, 2020

(54) METHOD FOR CONTROL OF A PROPULSION SYSTEM OF A VEHICLE, A PROPULSION SYSTEM, A COMPUTER PROGRAM PRODUCT AND A VEHICLE

(71) Applicant: Scania CV AB, Södertälje (SE)

(72) Inventors: Johan Lindström, Nyköping (SE);
Mathias Björkman, Tullinge (SE);
Mikael Bergquist, Huddinge (SE);
Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 148 days.

(21) Appl. No.: 15/106,990

(22) PCT Filed: Dec. 22, 2014

(86) PCT No.: PCT/SE2014/051558
§ 371 (c)(1),
(2) Date: Jun. 21, 2016

(87) PCT Pub. No.: WO2015/099592
PCT Pub. Date: Jul. 2, 2015

(65) Prior Publication Data
US 2017/0001622 A1    Jan. 5, 2017

(30) Foreign Application Priority Data
Dec. 23, 2013 (SE) ...................... 1351583

(51) Int. Cl.
*B60W 20/10* (2016.01)
*B60K 6/365* (2007.10)
(Continued)

(52) U.S. Cl.
CPC ............ *B60W 20/10* (2013.01); *B60K 6/365* (2013.01); *B60K 6/387* (2013.01); *B60K 6/48* (2013.01);
(Continued)

(58) Field of Classification Search
CPC . G01C 21/3602; G01C 21/30; G06K 9/00798
See application file for complete search history.

(56) References Cited

U.S. PATENT DOCUMENTS

| 5,433,282 | A | 7/1995 | Moroto et al. |
| 5,492,189 | A | 2/1996 | Kriegler et al. |
| (Continued) |

FOREIGN PATENT DOCUMENTS

| DE | 19628000 A1 | 1/1997 |
| DE | 19650723 A1 | 6/1997 |
| (Continued) |

OTHER PUBLICATIONS

International Search Report for PCT/SE2014/051558 dated Apr. 22, 2015.
(Continued)

*Primary Examiner* — Hunter B Lonsberry
*Assistant Examiner* — Mathew Franklin Gordon
(74) *Attorney, Agent, or Firm* — Moore & Van Allen PLLC; W. Kevin Ransom

(57) ABSTRACT

Method for control of a drive system comprising a combustion engine with output shaft, gearbox with input shaft, electrical machine, and planetary gear comprising a sun wheel, a ring gear and a planetary wheel carrier. The method comprises, if torque from the combustion engine and the electrical machine is sufficient for the operation of the vehicle with the planetary gear in the release position, and if the vehicle's fuel consumption with the planetary gear in the release position is lower than in the locked position, controlling the electrical machine and the combustion engine such that the requested torque is provided, with the planetary gear in the release position. Otherwise, set the planetary gear in the locked position. A second locking means adapted to divide the combustion engine's output
(Continued)

shaft in two sections in a release position, kept in a locked position if the planetary gear is in the release position.

19 Claims, 4 Drawing Sheets

(51) Int. Cl.
| | |
|---|---|
| *B60K 6/387* | (2007.10) |
| *B60K 6/48* | (2007.10) |
| *B60W 10/02* | (2006.01) |
| *B60W 10/06* | (2006.01) |
| *B60W 10/08* | (2006.01) |
| *B60W 20/00* | (2016.01) |
| B60K 6/40 | (2007.10) |
| B60W 30/18 | (2012.01) |
| B60K 6/547 | (2007.10) |

(52) U.S. Cl.
CPC ............ *B60W 10/02* (2013.01); *B60W 10/06* (2013.01); *B60W 10/08* (2013.01); *B60W 20/00* (2013.01); B60K 6/40 (2013.01); B60K 6/547 (2013.01); B60W 30/18 (2013.01); B60W 2710/021 (2013.01)

(56) References Cited

U.S. PATENT DOCUMENTS

| | | |
|---|---|---|
| 5,508,574 A | 4/1996 | Vlock |
| 5,735,770 A | 4/1998 | Omote et al. |
| 6,018,198 A | 1/2000 | Tsuzuki et al. |
| 6,354,974 B1 | 3/2002 | Kozarekar |
| 6,579,201 B2 | 6/2003 | Bowen |
| 7,237,634 B2 | 7/2007 | Severinsky et al. |
| 7,282,008 B2 | 10/2007 | Oshidari |
| 8,182,391 B2 | 5/2012 | Klemen et al. |
| 8,403,807 B2* | 3/2013 | Tabata ................... B60K 6/365 477/3 |
| 8,500,589 B2 | 8/2013 | Ortmann et al. |
| 8,727,925 B2 | 5/2014 | Kaltenbach et al. |
| 8,840,502 B2 | 9/2014 | Bergquist |
| 8,905,892 B1 | 12/2014 | Lee et al. |
| 9,139,076 B2 | 9/2015 | Lee et al. |
| 9,266,418 B2 | 2/2016 | Lee et al. |
| 9,327,716 B2 | 5/2016 | Pettersson et al. |
| 9,441,708 B2 | 9/2016 | Kimes et al. |
| 9,592,821 B2 | 3/2017 | Pettersson et al. |
| 9,643,481 B2 | 5/2017 | Goleski et al. |
| 9,937,920 B2 | 4/2018 | Lindström et al. |
| 2005/0049100 A1 | 3/2005 | Ai et al. |
| 2007/0056784 A1* | 3/2007 | Joe ........................ B60K 6/48 180/65.245 |
| 2007/0102209 A1 | 5/2007 | Doebereiner |
| 2008/0009380 A1 | 1/2008 | Iwanaka et al. |
| 2008/0081734 A1 | 4/2008 | Duffy et al. |
| 2008/0318728 A1 | 12/2008 | Soliman et al. |
| 2009/0075779 A1 | 3/2009 | Kumazaki et al. |
| 2009/0076694 A1* | 3/2009 | Tabata ................... B60K 6/365 701/58 |
| 2009/0145673 A1 | 6/2009 | Soliman et al. |
| 2010/0099532 A1 | 4/2010 | Cashen |
| 2012/0028757 A1* | 2/2012 | Kimura ................. B60K 6/445 477/5 |
| 2012/0197475 A1 | 8/2012 | Akutsu et al. |
| 2013/0102429 A1 | 4/2013 | Kaltenbach et al. |
| 2013/0109530 A1 | 5/2013 | Kaltenbach et al. |
| 2013/0316865 A1 | 11/2013 | Engström et al. |
| 2014/0024490 A1 | 1/2014 | Bangura et al. |
| 2014/0051537 A1 | 2/2014 | Liu et al. |
| 2014/0243149 A1 | 8/2014 | Holmes et al. |
| 2015/0149012 A1 | 5/2015 | Pettersson et al. |
| 2015/0239459 A1* | 8/2015 | Pettersson ............. B60K 6/365 477/3 |
| 2015/0375734 A1 | 12/2015 | Pettersson et al. |
| 2016/0052381 A1 | 2/2016 | Kaltenbach et al. |
| 2016/0159344 A1 | 6/2016 | Hata et al. |
| 2016/0176396 A1 | 6/2016 | Hata et al. |
| 2016/0288784 A1 | 10/2016 | Teraya et al. |
| 2017/0001622 A1 | 1/2017 | Lindstrom et al. |
| 2017/0001634 A1 | 1/2017 | Lindstrom et al. |
| 2017/0043763 A1 | 2/2017 | Ketfi-Cherif et al. |
| 2017/0144649 A1 | 5/2017 | Bangura et al. |
| 2017/0282702 A1 | 10/2017 | Kim |

FOREIGN PATENT DOCUMENTS

| | | |
|---|---|---|
| DE | 19838853 A1 | 3/1999 |
| DE | 19841829 A1 | 3/2000 |
| DE | 102006054405 A1 | 6/2008 |
| DE | 102007004458 A1 | 7/2008 |
| DE | 102007004464 A1 | 7/2008 |
| DE | 19628000 B4 | 1/2010 |
| DE | 102009000970 A1 | 8/2010 |
| DE | 102011084930 A1 | 4/2013 |
| DE | 19838853 B4 | 11/2013 |
| EP | 552140 A1 | 10/1995 |
| EP | 552140 B1 | 10/1995 |
| EP | 1145896 A1 | 10/2001 |
| EP | 769404 A1 | 12/2001 |
| EP | 1304249 A2 | 4/2003 |
| EP | 1319546 A1 | 9/2004 |
| EP | 1319546 B1 | 9/2004 |
| EP | 2436546 A1 | 4/2012 |
| FR | 2832356 A1 | 5/2003 |
| JP | 07135701 A | 5/1995 |
| JP | 11332018 A | 11/1999 |
| JP | 3291871 B2 | 6/2002 |
| SE | 1051384 A1 | 6/2012 |
| SE | 536329 C2 | 8/2013 |
| SE | 1200390 A1 | 12/2013 |
| SE | 1200394 A1 | 12/2013 |
| SE | 1250696 A1 | 12/2013 |
| SE | 1250698 A1 | 12/2013 |
| SE | 1250699 A1 | 12/2013 |
| SE | 1250700 A1 | 12/2013 |
| SE | 1250702 A1 | 12/2013 |
| SE | 1250706 A1 | 12/2013 |
| SE | 1250708 A1 | 12/2013 |
| SE | 1250711 A1 | 12/2013 |
| SE | 1250716 A1 | 12/2013 |
| SE | 1250717 A1 | 12/2013 |
| SE | 1250718 A1 | 12/2013 |
| SE | 1250720 A1 | 12/2013 |
| SE | 536559 C2 | 2/2014 |
| WO | 0006407 A1 | 2/2000 |
| WO | 2007113438 A1 | 10/2007 |
| WO | 2008016357 A2 | 2/2008 |
| WO | 2012091659 A1 | 7/2012 |
| WO | 2013002707 A1 | 1/2013 |

OTHER PUBLICATIONS

Written Opinion of the International Search Authority for PCT/SE14/051558 dated Apr. 22, 2015.

Scania CV AB, German Patent Application No. 112014005375.9, Office Action, dated Feb. 20, 2019.

* cited by examiner

METHOD FOR CONTROL OF A PROPULSION SYSTEM OF A VEHICLE, A PROPULSION SYSTEM, A COMPUTER PROGRAM PRODUCT AND A VEHICLE

CROSS REFERENCE TO THE APPLICATION

This application is a national stage application (filed under 35 § U.S.C. 371) of PCT/SE2014/051558, filed Dec. 22, 2014 of the same title, which, in turn claims priority to Swedish Application No. 1351583-8, filed Dec. 23, 2013 of the same title; the contents of each of which are hereby incorporated by reference.

FIELD OF THE INVENTION

The present invention relates to a method for the control of a drive system for a vehicle, and is particularly, but not exclusively, focused on control of such a drive system in motor vehicles in the form of wheeled commercial vehicles, especially heavy goods vehicles such as trucks and buses. The invention thus relates to a drive system for driving a hybrid vehicle which, generally, is a vehicle that may be powered by a primary engine, in this case a combustion engine, and a secondary engine, in this case an electrical machine. The vehicle is suitably equipped with means for storage of energy, such as a battery or a capacitor for storage of electric energy, and control equipment to control the flow of electric energy between the means and the electrical machine. The electrical machine may thus alternately operate as an engine or as a generator, depending on the vehicle's operating mode. When the vehicle decelerates, the electrical machine generates electric energy that may be stored, and the stored electric energy is used later for e.g. operation of the vehicle.

BACKGROUND OF THE INVENTION

Using a conventional clutch mechanism, which disconnects the input shaft of the gearbox from the combustion engine during a shifting process in the gearbox, entails disadvantages, such as heating of the clutch mechanism's discs, which results in an increased fuel consumption and wear of the clutch discs. There are also large losses as a result, in particular when the vehicle is started. A conventional clutch mechanism is also relatively heavy and costly. It also occupies a relatively large space in the vehicle. Friction losses also arise at the use of a hydraulic converter/torque converter commonly used in automatic transmission. By ensuring that the vehicle has a drive system in which the output shaft of the combustion engine, the rotor of the electrical machine and the input shaft of the gearbox are connected with a planetary gear, the conventional clutch mechanism and disadvantages associated therewith may be avoided. A vehicle with a drive system of this type constitutes prior art as set out in EP 1 319 546 and SE 1051384-4.

Although this drive system, especially the one described in SE 1051384-4, functions well and has a range of advantageous features, efforts are constantly made to improve such a drive system with respect to its behavior and function in certain operating situations.

The present invention thus also relates to a drive system for a vehicle as set out above.

Conventional drive systems are adapted so that they only offer a small number of operating modes, which are adapted for the main loads at the operation of the vehicle. One disadvantage of conventional drive systems is that the operating modes result in a relatively fuel-intensive operation of the vehicle and a limited torque range at a low load.

U.S. Pat. No. 6,354,974 shows a drive system for a hybrid vehicle. The hybrid vehicle comprises a combustion engine and an electrical machine, which is arranged on the combustion engine's output shaft. The objective here is to create a compact drive unit, which does not need to use a conventional clutch mechanism. The conventional clutch mechanism has here been replaced by a planetary gear and three friction clutches. With the help of the friction clutches, different operating modes may be created in the vehicle. The use of friction clutches results in energy losses.

SUMMARY OF THE INVENTION

One objective of the present invention is to provide a method for control of a drive system in a vehicle, with the objective of reducing fuel consumption of the vehicle.

At low loads for the operation of the vehicle it is, fuel-economically, advantageous to maneuver the drive system according to the method. The method comprises the step of determining whether torque from the combustion engine and the electrical machine is sufficient for the operation of the vehicle with the planetary gear in a release position, i.e. whether it is possible to drive the vehicle according to the requested torque with the planetary gear in a release position. The method also comprises the step of determining whether the vehicle's fuel consumption with the planetary gear in the release position is lower than the fuel consumption in the locked position, i.e. whether it is advantageous with respect to the vehicle's fuel consumption to drive the vehicle with the planetary gear in a release position.

If both conditions are met, the method comprises, in the subsequent step, controlling the electrical machine and the combustion engine simultaneously, so that the requested torque is provided. The control of the electrical machine and the combustion engine occurs while the planetary gear is in the release position, and while the combustion engine's engine speed is kept constant. If, on the other hand, any of the conditions are not met, the planetary gear is set in the locked position and the method is completed.

Since the operation of the vehicle according to the method takes place while the engine speed of the combustion engine is maintained, it is possible to reduce the fuel consumption, since a low engine speed results in lower friction losses in the combustion engine in relation to a high engine speed. The method thus facilitates a reduced fuel consumption compared to drive systems according to prior art.

The combustion engine according to the method contributes to the propulsion of the vehicle, and not only to operating potential auxiliary aggregates in the vehicle, as in prior art. The method is suitable at low operating loads/requested torque in relation to the vehicle's primary operational load/requested torque.

The method facilitates control of the engine speed of the combustion engine, with the objective of achieving an optimal operating condition. The low engine speed facilitates e.g. a temperature increase of the exhaust temperature from the combustion engine, which is advantageous for the purification of exhausts in an exhaust after-treatment system.

By carrying out the innovative method in a drive system with a said second locking means, and keeping this in a locked position if the first locking means is in a release position, potential advantageous driving styles of the vehicle in a range of situations are made available.

According to one embodiment of the invention, the method is initiated with the steps:
information about a first operating parameter of the combustion engine and a second operating parameter of the electrical machine is received,
the vehicle's fuel consumption, with the planetary gear in the release position and in the locked position, respectively, is determined based on the first and the second operating parameters,
if the vehicle's fuel consumption with the planetary gear in a release position is lower than in the locked position, the planetary gear is set in the release position, and the steps a)-d) are iterated. The iteration according to steps a)-d) is thus initiated only if the release position results in a lower fuel consumption than does the locked position.

According to another embodiment of the invention, the planetary gear is moved to the locked position and the second locking means to the release position, if the planetary gear is in the free position and information is obtained that a braking of the vehicle is imminent, and the requested braking torque exceeds a first predetermined value, but is lower than a second predetermined value. By moving the second locking means to its release position, so that, it is possible to brake with full electrical machine torque until the vehicle stops, by keeping the planetary gear in its locked position. At this stage, one may optionally let the combustion engine run at idling speed or turn it off. By carrying out the innovative method in a drive system with a said second locking means, it is thus possible to brake with full electrical machine torque, as opposed to braking with a corresponding drive system not comprising anything corresponding to the second locking means. With such a corresponding drive system, it is therefore possible to brake only with a torque providing a reaction torque to the combustion engine, smaller than or equal to its resulting friction torque, unless it is intended that the combustion engine should be allowed to rev up. In addition, according to the present invention, it is possible to brake with full electrical machine torque without turning off the combustion engine, so that it does not need to be started again in case the driver of the vehicle chooses to interrupt the braking and to request a large driving torque instead.

According to another embodiment of the invention, the first predetermined value of the braking torque corresponds to the reaction torque, which results from the combustion engine's friction torque, and/or the second predetermined value of the braking torque corresponds to the braking torque, which the electrical machine is able to produce. Accordingly, it is advantageous to keep the first locking means in a locked position, and the second in a release position, at a braking torque applying a higher reaction torque to the combustion engine than its friction torque, which would lead to the combustion engine revving up, if the first locking means is in a release position and the second locking means in a locked position.

At the same time, it is most suitable to have both locking means in the locked position at a higher braking torque than the electrical machine is able to produce, since the combustion engine then contributes with braking torque via its inner friction.

According to another embodiment of the invention, if the planetary gear is set or kept in a locked position, and information about an imminent braking of the vehicle to stop is obtained, the second locking means is moved to the release position. Accordingly, it is possible to brake with a high torque in the electrical machine even at low speeds.

According to another embodiment of the invention, if the planetary gear is in the free position, and information is obtained about a request for preparedness to turn off the combustion engine, the planetary gear is moved to the locked position, and the second locking means is moved to the release position.

According to another embodiment of the invention, if the planetary gear is set or maintained in the locked position, and information is obtained about a request for preparedness to turn off the combustion engine, the second locking means is moved to the release position. Accordingly, a good preparedness for turning off the combustion engine is achieved as soon as required.

According to another embodiment of the invention, if the planetary gear is in the free position, and a rapidly varying powertrain torque in the vehicle is detected, the planetary gear is moved to the locked position. Accordingly, variations in the combustion engine's engine speed may arise in case the first locking means is in a release position, and the second either in a locked position, i.e. where the combustion engine's output shaft becomes locked together with said first component in the planetary gear, or in a release position at a request for disconnection of the combustion engine.

According to one embodiment of the invention, if the planetary gear is in the open position, the electrical machine is controlled, with respect to either a torque or a rotational speed, and the combustion engine is controlled with respect to the second of either the torque or the engine speed.

Preferably, the electrical machine is controlled with respect to the torque, while the combustion engine is controlled with respect to the engine speed. Accordingly, the method facilitates the operation of the vehicle taking place at a low engine speed in the combustion engine, which is advantageous for reduction of fuel consumption. Alternatively, the electrical machine is controlled with respect to rotational speed, while the combustion engine is controlled with respect to a torque.

According to one embodiment of the invention, the first operating parameter is the combustion engine's engine speed. The fuel consumption of the vehicle depends on the combustion engine's engine speed, since the friction losses increase at an increased engine speed. Accordingly, as low an engine speed as possible in the combustion engine is advantageous for reduction of fuel consumption during the iteration of the steps a)-d).

According to one embodiment of the invention, the second operating parameter is the electrical machine's developed torque. The vehicle's fuel consumption is dependent on the electrical machine's developed torque, since the amount of energy in the energy storage means drops depending on the developed torque, and is subsequently refilled with energy from the combustion engine.

According to one embodiment of the invention, the planetary wheel carrier and the sun wheel are locked to each other when the planetary gear is set in the locked position, and the planetary wheel carrier and the sun wheel are released from each other when the planetary gear is set in the release position.

According to one embodiment of the invention, the first locking means is adapted to connect the ring gear and the planetary wheel carrier in the locked position, so that they rotate together, the shifting from the locked position and the release position comprising:
the electrical machine and the combustion engine are controlled to a mutual torque-free state, and
the first locking means are released from engagement with the ring gear and the planetary wheel carrier, so that the ring gear and the planetary wheel carrier are freely rotatable in relation to each other.

According to one embodiment of the invention, the first locking means is adapted to connect the ring gear and the planetary wheel carrier in the locked position, so that they rotate together, the shifting from the release position to the locked position comprising:

the electrical machine and the combustion engine are controlled to a synchronous rotational speed, and the first locking means is moved into engagement with the ring gear and the planetary wheel carrier.

According to one embodiment of the invention, the combustion engine's output shaft is connected with the sun wheel, so that they rotate as one unit with a first rotational speed, the input shaft of the gearbox is connected with the planetary wheel carrier, so that they rotate as one unit with a second rotational speed, and the electrical machine's rotor is connected with the ring gear, so that the ring gear rotates with a third rotational speed.

The present invention also relates to the drive system mentioned above. The drive system is wherein it comprises a control device adapted to, if the torque from the combustion engine and the electrical machine is sufficient for the operation of the vehicle with the planetary gear in a release position, and if the vehicle's fuel consumption/total energy consumption with the planetary gear in the release position is lower than in the locked position, control the electrical machine and the combustion engine in such a way that the requested torque is provided while the planetary gear is in a release position, and while maintaining the combustion engine's engine speed.

According to one embodiment of the invention, the drive system comprises means to control the engine speed of the combustion engine. The means to control the engine speed may e.g. be an engine speed governor.

According to one embodiment of the invention, the drive system comprises means to control the torque of the electrical machine. Preferably, the developed torque from the electrical machine is controlled by way of the control system controlling the supply or the generation of electric power.

BRIEF DESCRIPTION OF THE DRAWINGS

Below is a description, as an example, of preferred embodiments of the invention with reference to the enclosed drawings.

DETAILED DESCRIPTION OF PREFERRED EMBODIMENTS OF THE INVENTION

Figure 1A:
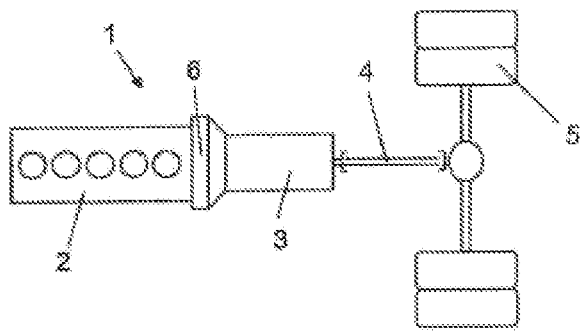
FIG. 1a shows a drive system for operation of a vehicle according to the present invention.

FIG. 1a shows a powertrain for a heavy goods vehicle 1. The powertrain comprises a combustion engine 2, a gearbox 3, a number of driving shafts 4 and driving wheels 5. Between the combustion engine 2 and the gearbox 3, the powertrain comprises an intermediate section 6.

Figure 1B:
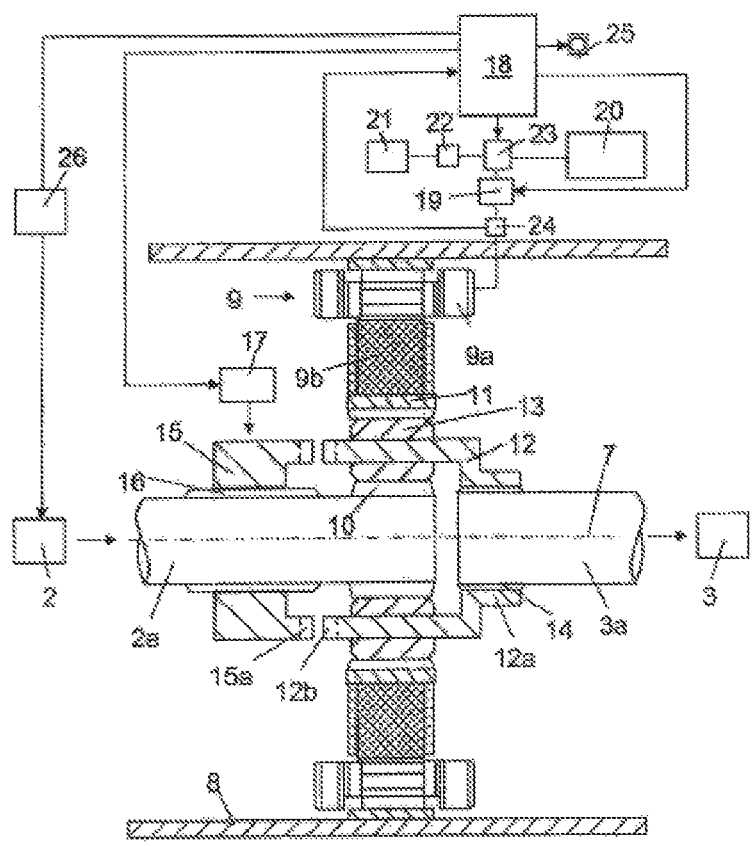
FIG. 1b shows the drive system in FIG. 1a in detail.
Figure 1C:
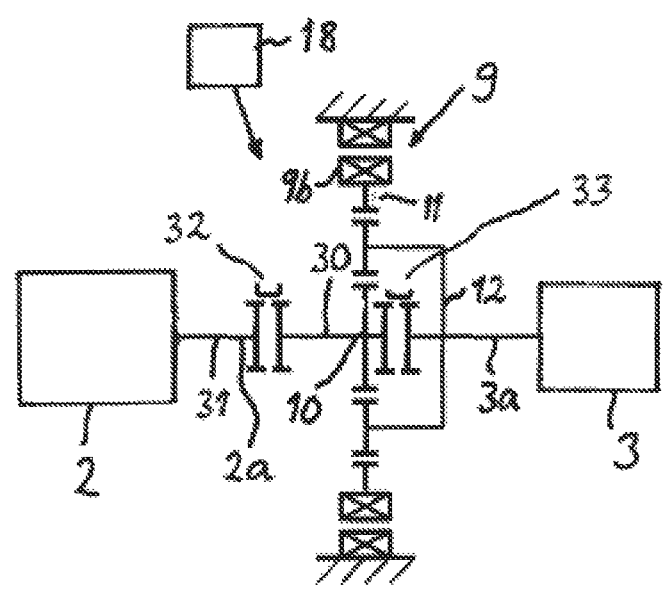
FIG. 1c schematically shows the fundamental structure of the innovative drive system.

FIG. 1b shows the components in the intermediate section 6 in further detail. The combustion engine 2 is equipped with an output shaft 2a (divided into two parts 30, 31, as displayed in FIG. 1c), and the gearbox 3 with an input shaft 3a in the intermediate section 6. The output shaft 2a of the combustion engine is coaxially arranged in relation to the input shaft 3a of the gearbox. The combustion engine's output shaft 2a and the input shaft 3a of the gearbox are rotatably arranged around a common rotation axis 7. The intermediate section 6 comprises a house 8, enclosing an electrical machine 9 and a planetary gear. The electrical machine 9 comprises, in a customary manner, a stator 9a and a rotor 9b. The stator 9a comprises a stator core which is mounted in a suitable manner on the inside of the house 8. The stator core comprises the stator's windings. The electrical machine 9 is adapted, under certain operating circumstances, to use stored electrical energy to supply driving force to the input shaft 3a of the gearbox, and, under other operating conditions, to use the kinetic energy of the input shaft 3 of the gearbox to extract and store electric energy.

The planetary gear is arranged substantially radially on the inside in relation to the electrical machine's stator 9a and rotor 9b. The planetary gear comprises, in a customary manner, a sun wheel 10, a ring gear 11 and a planetary wheel carrier 12. The planetary wheel carrier 12 supports a number of cogwheels 13, which are rotatably arranged in a radial space between the teeth of the sun wheel 10 and the ring gear 11. The sun wheel 10 is attached to a peripheral surface of a first section 30 of the combustion engine's output shaft 2a. This section is attached to a second section 31 of the combustion engine's output shaft, closest to the combustion engine, via a second locking means 32, which may be moved between a locked position in which the combustion engine is locked with the sun wheel 10, and a released position in which the combustion engine is disconnected from the sun wheel and allowed to rotate independently of the planetary gear. The sun wheel 10 and the combustion engine's output shaft 2a rotate as one unit at a first rotational speed $n_1$. The planetary wheel carrier 12 comprises an attachment section 12a, which is attached on a peripheral surface of the input shaft 3a of the gearbox with the help of a splines joint 14. With the help of this joint, the planetary wheel carrier 12 and the input shaft 3a of the gearbox may rotate as one unit at a second rotational speed $n_2$. The ring gear 11 comprises an external peripheral surface on which the rotor 9b is fixedly mounted. The rotor 9b and the ring gear 11 constitute a rotatable unit that rotates at a third engine speed $n_3$.

The drive system also comprises a first locking means 33, adapted to move the planetary gear between a release position in which the sun wheel 10, the ring gear 11 and the planetary wheel carrier 12 are freely rotatable in relation to each other, and a locked position in which the planetary wheel carrier 12 and the sun wheel 10 are locked together. The locking means is adapted to connect the ring gear 11 and the planetary wheel carrier 12 in the locked position, so that they rotate together.

The movement between the locked position and the released position comprises control of the electrical machine 9 and the combustion engine 2 to a mutual torque-free state, and, subsequently, to shift the locking means from/to engagement with the ring gear 11 and the planetary wheel carrier 12.

In the first locking means, the combustion engine's output shaft 2a is equipped with a shiftable clutch element 15. The clutch element 15 is attached on the combustion engine's output shaft 2a with the help of a splines joint 16. The clutch element 15 is in this case arranged in a twist-fast manner on the combustion engine's output shaft 2a, and is shiftably arranged in an axial direction on the combustion engine's output shaft 2a. The clutch element 15 comprises a clutch section 15a, which is connectable with a clutch section 12b in the planetary wheel carrier 12. A schematically displayed shifting element 17 is adapted to shift the clutch element 15 between a first position where the clutch sections 15a, 12b are not in engagement with each other, corresponding to a release position in the first locking means, and a second position where the clutch sections 15a, 12b are in engagement with each other, corresponding to a locked position of the first locking means. In this locked position the combustion engine's output shaft 2a and the input shaft 3a of the gearbox will be locked together, and these, as well as the electrical machine's rotor, will thus rotate at the same rotational speed. This state may be referred to as a locked planet. The locking mechanism may, advantageously, also have the design which is described in the not yet public Swedish patent application 1250696-0, and comprise a sleeve equipped with the first splines, which splines, in the release position, engages with second splines on a first component of the planetary gear and, in the locked position, engages with third splines on a second component of the planetary gear. In this case, the first component is preferably the planetary wheel carrier, and the second component is the sun wheel. The locking mechanism may then be adapted as an annular sleeve, enclosing the planetary wheel carrier substantially concentrically. The locking means may also consist of a suitable type of friction clutch.

The second locking means 32, which may have a similar design to the first locking means 33, is adapted to, in a release position, separate a second part 31 of the combustion engine's output shaft, arranged nearest the combustion engine, from a first part 30 thereof, connected with the planetary gear's sun wheel 10, so that the sun wheel 10 is allowed to rotate independently of the second part 31 of the combustion engine's output shaft. The second locking means may be moved to a locked position in which the parts 30, 31 of the combustion engine's output shaft are locked together. At a high powertrain torque, positive as well as negative, the locking means 32, 33 will be in a locked position.

At least the second locking means is preferably of a type that locks in case of a fault in its maneuvering system, so that the vehicle may then be driven to a garage.

An electronic control device 18, or several electronic control devices 18 in combination, are adapted to control the shifting element 17. The control device 18 is also adapted to determine the occasions on which the electrical machine 9 should operate as an engine, and on which occasions it should operate as a generator. To determine this, the control device 18 may receive up-to-date information relating to suitable operating parameters. The control device 18 may be a computer with software suitable for this purpose. The control device 18 also controls a schematically displayed control equipment 19, which controls the flow of electric energy between an energy storage means 20 and the stator 9a of the electrical machine. The energy storage means is preferably a hybrid battery or a capacitor. On occasions where the electrical machine 9 operates as an engine, stored electric energy is supplied from the energy storage means 20 to the stator 9a. On occasions where the electrical machine operates as a generator, electric energy is supplied from the stator 9a to the energy storage means 20. The energy storage means 20 delivers and stores electric energy with a voltage in the range of 300-900 volts. Since the intermediate section 6 between the combustion engine 2 and the gearbox 3 in a vehicle is limited, the electrical machine 9 and the planetary gear must constitute a compact unit. The planetary gear's components 10-12 are here arranged substantially radially inside the electrical machine's stator 9a. The rotor 9b of the electrical machine, the ring gear 11 of the planetary gear, the combustion engine's output shaft 2a and the input shaft 3a of the gearbox are here rotatably arranged around a common rotation axis 5. With such an embodiment, the electrical machine 9 and the planetary gear occupy a relatively small area.

The drive system comprises means to detect a first operating parameter of the combustion engine 2, and a second operating parameter of the electrical machine 9. Preferably, the first operating parameter is the combustion engine's engine speed, and the second operating parameter is the developed torque of the electrical machine 9, which is dependent on e.g. the size and phase inversion of the current to the electrical machine. The means for detecting the first operating parameter is e.g. an engine speed sensor connected to the combustion engine 2. The means for detecting the second operating parameter is e.g. a control system of the electrical machine 9, which provides information about the current's size and phase inversion.

The method according to the invention will be described in detail with reference to FIGS. 2 and 3. The steps in the method are controlled with the control device 18.

Figure 2:
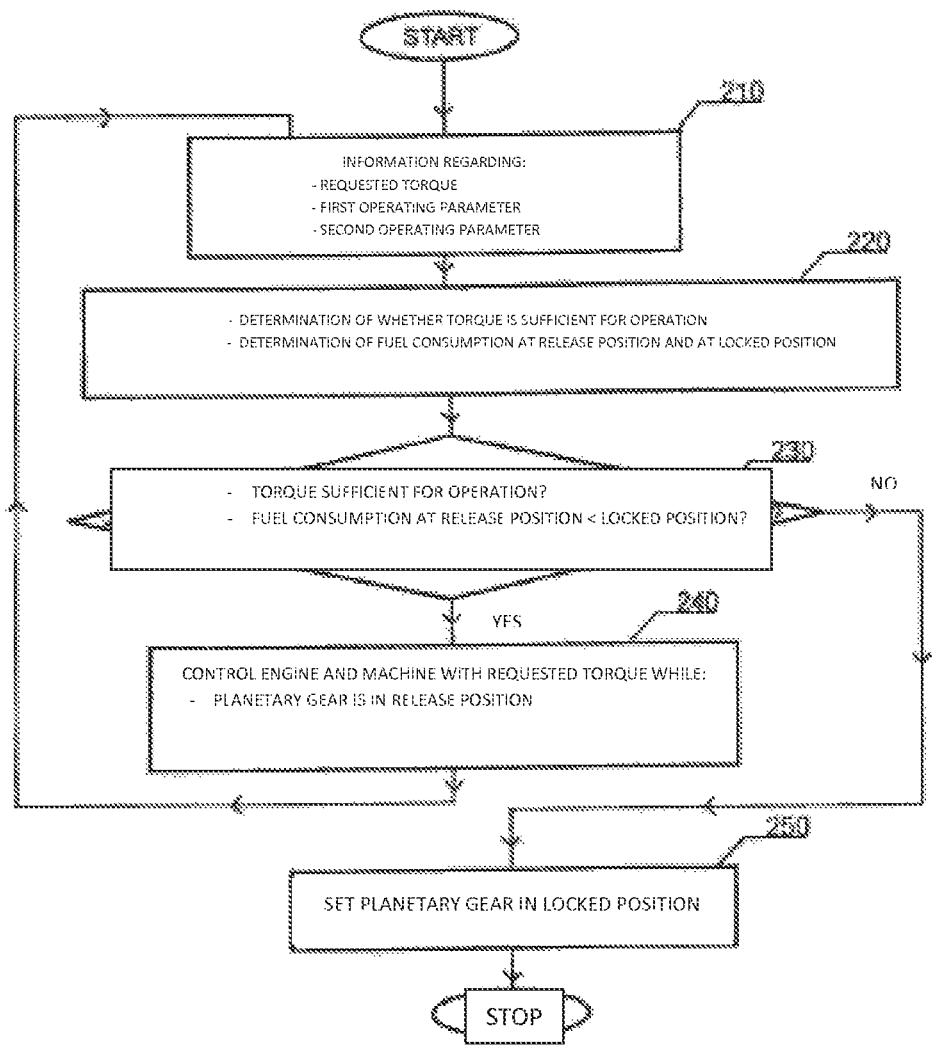
FIG. 2 shows a flow chart of a method for control of the drive system, according to a first embodiment of the invention.

FIG. 2 shows a method according to a first embodiment of the invention.

The method is started at step 210 with the receipt of information about a requested torque for the operation of the vehicle, a first operating parameter of the combustion engine 2 and a second operating parameter of the electrical machine 9.

The requested torque is determined by the user of the vehicle. The first operating parameter of the combustion engine 2, and the second operating parameter of the electrical machine 9, are parameters that impact the vehicle's fuel consumption both in the release position and in the locked position of the planetary gear. Preferably, the first operating parameter is the combustion engine's engine speed, and the second operating parameter is the developed torque from the electrical machine 9.

In step 220 the following is determined:
whether the torque from the combustion engine 2 and the electrical machine 9 is sufficient for the operation of the vehicle with the planetary gear in the release position, and
the fuel consumption with the planetary gear in the release position and in the locked position, respectively.

In step 230 it is determined whether the following two conditions are met:
i) the torque from the combustion engine 2 and the electrical machine 9 is sufficient for the operation of the vehicle with the planetary gear in the release position, and
ii) the fuel consumption with the planetary gear in a release position is less than the fuel consumption in the locked position.

If the two conditions may be answered affirmatively, the method continues to a step 240, where the electrical machine 9 and the combustion engine 2 are controlled in such a way that the requested torque is provided, while the planetary gear is in the release position, and while the combustion engine's engine speed remains unchanged. If, on the other hand, at least one of the conditions is answered in the negative, the planetary gear is set in the locked position in a step 250 and the method is completed.

The steps 210-240 of the method are iterated until one of the conditions in step 230 is answered in the negative. The method may also be interrupted in another manner, such as by order of the user. The iteration of the method according to steps 210-240 results in a reduced fuel consumption when driving the vehicle.

Figure 3:
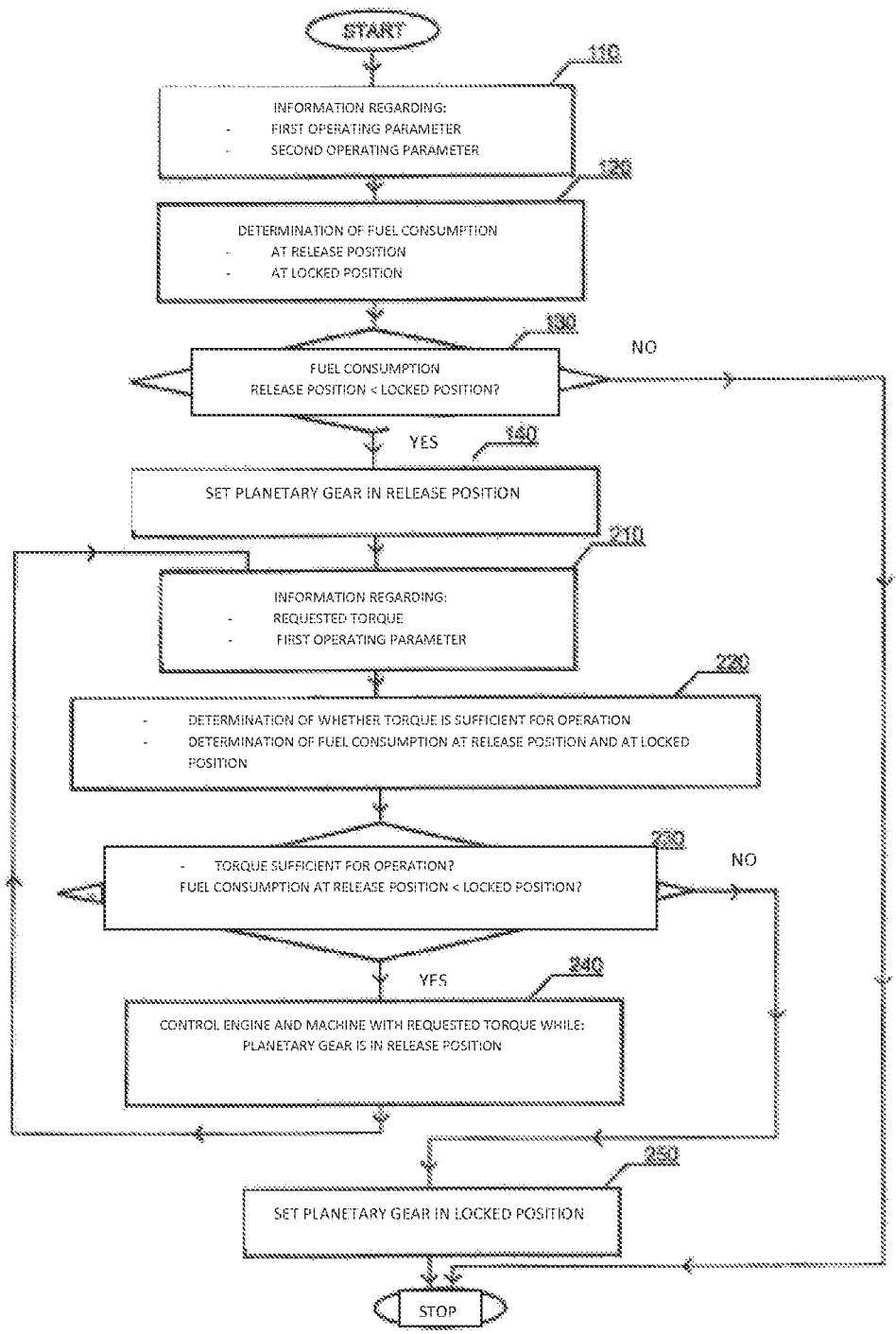
FIG. 3 shows a flow chart of a method for control of the drive system, according to a second embodiment of the invention.

FIG. 3 shows a method according to a second embodiment of the invention. The second embodiment differs from the first embodiment in the initial steps of the method.

The method is started at step 110 with the receipt of information about a requested torque for the operation of the vehicle, a first operating parameter of the combustion engine 2, and a second operating parameter of the electrical machine 9.

In a step 220, the fuel consumption is determined, with the planetary gear in the release position and the locked position, respectively. In a step 230, it is determined whether the fuel consumption with the planetary gear in the release position is smaller than in the locked position.

If the fuel consumption with the planetary gear in the release position is smaller than in the locked position, the planetary gear is set in the release position in a step 130, and the method is iterated according to steps 210-240 in the same manner as in FIG. 2. Otherwise the method is completed.

In some driving modes it is more fuel-efficient to drive the vehicle with the planetary gear in the release position. Such driving modes are typical when low positive or negative powertrain torques are required. Energy is thus saved, since the combustion engine 2 may be operated at a lower engine speed, where its friction losses are substantially smaller.

Driving with the combustion engine 2 idling, and the vehicle powered by the electrical machine 9, may also be realized in a parallel hybrid. Compared to the parallel hybrid, the drive system according to the invention provides a greater available positive torque in the open state. Therefore, driving with a low combustion torque may be used in several driving situations.

The release position may also be used to skip gear steps during acceleration. When it is time to shift up, the release position is selected, and acceleration is increased a little with the help of the electrical machine's larger engine speed range, and then a higher gear is synced into.

When driving in the release position, the electrical machine 9 is torque-controlled, and the combustion engine 2 is engine speed-controlled towards the lowest engine speed where the required torque may be obtained. Normally, this engine speed is the same as the idling engine speed of the engine 2, which is the lowest possible for reasons of comfort, such as vibrations, etc.

Engine speed control is achieved with an engine speed governor that controls the combustion engine 2 towards the desired engine speed with the help of torque control. In control system terms, such an engine speed governor is located near the actuator in the control system.

When the planetary gear is set in the release position, and the combustion engine 2 is operating at its idling speed, two effects are obtained:

i) The friction losses in the combustion engine 2 drop because the engine speed is reduced;

ii) The losses in the electrical machine 9 and the energy storage means 20 increase, since a larger fraction of the total powertrain torque is created by the electrical machine 9.

Furthermore, the load balance in the energy storage means 20 is altered, so that this must either be reloaded or drained in a manner that eventually creates more losses than what would have been the case if the planetary gear was not in the release position. These future losses must also be included in the increased electrical losses, which are a result of driving with the planetary gear in the release position. It is fuel-economical to drive with the planetary gear in the release position, if the reduced losses according to point 1 exceed the increased losses according to point 2.

Advantages of the innovative system, compared to a conventional parallel hybrid with a clutch, are as follows:

at positive powertrain torques, the combustion engine 2 helps with 40% (gear ratio-dependent and depending on the configuration of the planetary gear) of the torque, even though it operates at idling speed, the combustion engine 2 adds useful work in the drive system, in addition to powering potential auxiliary aggregates (such as servo), greater available torque area at positive powertrain torques than with only the electrical machine 9, the exhaust temperatures may be increased, since a larger combustion engine torque may be extracted at a low engine speed, which is an advantage for the exhaust after-treatment system, at braking/brake recovery the need for supply of fuel to the combustion engine 2 is reduced, since it will be dragged during the braking.

One disadvantage which would occur if the second locking means were not available, compared to electric operation with the planetary gear in the release position, is that it would only be possible to brake with a limited torque in this state without the combustion engine 2 revving up. The combustion engine 2 could in this case be turned off during such drive. It would then have to be decelerated to a zero engine speed with a flywheel brake, or be controlled down to zero, since the electrical machine torque is temporarily adjusted with a suitable positive torque, and subsequently the combustion engine is locked. The vehicle's acceleration may then simultaneously be controlled by the control device 18, with the help of the service brake.

With the help of the second locking means, which facilitates decoupling of the combustion engine from the planetary gear, the combustion engine need not be locked to electric operation, as in the case of the flywheel brake, but instead the second locking means is moved to the release position, and at this point it becomes possible to brake at full electrical machine torque without the combustion engine revving up. Since it is possible to brake at full electrical machine torque without turning off the combustion engine, the combustion engine does not need to be started again, in case the driver of the vehicle chooses to interrupt the braking and instead request a large driving torque. With the second locking means it also becomes possible to start driving the vehicle from a standstill without starting the combustion engine, since the second locking means is kept in a release position, and the first locking means is kept in a locked position, and the electrical machine in this case rotates the input shaft of the gearbox at the same rotation speed as its rotor. The possibility of decoupling the combustion engine by moving the second locking means to the release position may also be used in the above driving cases at low positive and negative powertrain torques, to save fuel and hence keep the combustion engine at an idling speed or turn it off, and to power the vehicle only with the electrical machine.

Further possibilities of varying and improving the methods mentioned above via the existence of the second locking means are set out in the description of embodiments of the invention in the introduction hereto.

The invention is obviously not limited in any way to the embodiments described above, but numerous possible modifications thereof should be obvious to a person skilled in the area, without such person departing from the spirit of the invention as defined by the appended claims.

The first locking means may be adapted to lock together any two of said three components.

A transmission could be arranged between the rotor and the ring gear, and also between the combustion engine's output shaft and the sun wheel, such as upstream of the shaft which is displayed in FIG. 1b, connected with the sun wheel. The latter transmission could also consist of a variable gear.

The invention claimed is:

1. A method for control of a drive system in a vehicle, wherein the drive system comprises a combustion engine with an output shaft, a gearbox with an input shaft, an electrical machine comprising a stator and a rotor, and a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of such third of said components, and wherein the drive system also comprises a first locking means, which may be moved between a locked position in which two of said components are locked together, so that the three components rotate at the same rotational speed, and a release position in which the components are allowed to rotate at different rotational speeds, wherein the method is carried out in a drive system which also comprises a second locking means, which may be moved between a locked position in which the output shaft of the combustion engine is locked together with said first of said components, and a release position, in which the combustion engine's output shaft is disconnected from said first of said components and allowed to rotate independently of said first of said components, and in that the second locking means is kept in the locked position if the first locking means, is in the release position, and in that the method comprises that the steps a)-d) are iterated as follows:

a) receive information about a requested torque for operation of the vehicle, at least a first operating parameter of the combustion engine, and at least a second operating parameter of the electrical machine;

b) determine whether an available torque from the combustion engine and the electrical machine is sufficient to achieve the requested torque, with the planetary gear in the release position;

c) determine a fuel consumption of the vehicle with the planetary gear in the release position and in the locked position, respectively, is determined based on the first and the second operating parameters; and d) if the available torque from the combustion engine and the electrical machine is sufficient to achieve the requested torque with the planetary gear in the release position, and if the vehicle's fuel consumption with the planetary gear in the release position is lower than in the locked position, set or keep the planetary gear in the release position, and control the electrical machine and the combustion engine in such a way that the requested torque is provided while the planetary gear is in the release position, otherwise set or keep the planetary gear in the locked position, and the method is completed.

2. The method for control of a drive system according to claim 1, wherein the method is started with the steps:

receive information about a first operating parameter of the combustion engine and a second operating parameter of the electrical machine;

determine a fuel consumption of the vehicle, with the planetary gear in the release position and in the locked position, respectively, based on the first and the second operating parameters; and if the vehicle's fuel consumption with the planetary gear in a release position is lower than in the locked position, set the planetary gear in the release position, and the steps a)-d) are iterated.

3. The method according to claim 1, wherein, in the event the planetary gear is in a free position, and the vehicle is to be decelerated, and a braking torque to decelerate the vehicle exceeds a first predetermined value of braking torque but is lower than a second predetermined value of braking torque, move the planetary gear to the locked position, and move the second locking means to a release position.

4. The method according to claim 3, wherein the first predetermined value of the braking torque corresponds to a reaction torque, which results from a friction torque of the combustion engine, and/or the second predetermined value of the braking torque corresponds to a maximum braking torque that the electrical machine is able to produce.

5. The method according to claim 1, wherein, if the planetary gear is set or maintained in the locked position, and the vehicle is to be decelerated towards a stop, the method comprises move the second locking means to the release position.

6. The method according to claim 3, wherein, in case the planetary gear is in the free position, and the combustion engine is to be turned off, the method comprises move the planetary gear to the locked position and the second locking means to the release position.

7. The method according to claim 1, wherein, in case the planetary gear is set or maintained in the locked position, and the combustion engine is to be turned off, the second locking means is moved to the release position.

8. The method according to claim 3, wherein, if the planetary gear is in the free position, and there is a rapidly varying powertrain torque in the vehicle, the method comprises move the planetary gear to the locked position.

9. The method according to claim 1, wherein, if the planetary gear is in an open state, control the electrical machine with respect to either one of a torque or an engine speed, and control the combustion engine with respect to the other of either torque or engine speed.

10. The method according to claim 1, wherein the first operating parameter is an engine speed of the combustion engine.

11. The method according to claim 1, wherein the second operating parameter is a developed torque of the electrical machine.

12. The method according to claim 1, wherein the first locking means is adapted to connect the ring gear and the planetary wheel carrier, so that they rotate together, the shift from a locked position to the release position comprising that:

control the electrical machine and the combustion engine to operate at a mutual torque-free state; and release the first locking means from engagement with the ring gear and the planetary wheel carrier, so that the ring gear and the planetary wheel carrier are freely rotatable in relation to each other.

13. The method according to claim 1, wherein the first locking means is adapted to connect the ring gear and the planetary wheel carrier in the locked position, so that they rotate together, the shift from the release position to the locked position comprising that:

control the electrical machine and the combustion engine to operate at a synchronous rotational speed; and move the first locking means into engagement with the ring gear and the planetary wheel carrier.

14. The method according to claim 1, wherein the output shaft of the combustion engine is connected with the sun wheel, so that they rotate as one unit with a first rotational speed, the input shaft of the gearbox is connected with the planetary wheel carrier, so that they rotate as one unit with a second rotational speed, and the rotor of the electrical machine is connected with the ring gear, so that the ring gear rotates with a third rotational speed.

15. A drive system for a vehicle, the drive system comprising a combustion engine with an output shaft, a gearbox with an input shaft, an electrical machine comprising a stator and a rotor, and a planetary gear, which comprises three components in the form of a sun wheel, a ring gear and a planetary wheel carrier, wherein the output shaft of the combustion engine is connected with a first of said components in the planetary gear, so that a rotation of this shaft leads to a rotation of such first of said components, wherein the input shaft of the gearbox is connected with a second of said components in the planetary gear, so that a rotation of such shaft leads to a rotation of such second of said components, and wherein the rotor electrical machine is connected with a third of said components in the planetary gear, so that a rotation of the rotor leads to a rotation of such third of said components, and wherein the drive system also comprises a first locking means, which may be moved between a locked position in which two of said components are locked together, so that the three components rotate with the same rotational speed, and a release position in which the components are allowed to rotate at different rotational speeds, wherein the drive system comprises a second locking means, which may be moved between a locked position in which the output shaft of the combustion engine is locked together with said first of said components, and a release position, in which the combustion engine's output shaft is disconnected from said first of said components and allowed to rotate independently of said first of said components, and a control device adapted to receive information about a requested torque for operation of the vehicle, at least a first operating parameter of the combustion engine and at least one second operating parameter of the electrical machine, to control the second locking means, so that it is kept in its locked position if the first locking means is in its release position, to determine whether an available torque from the combustion engine and the electrical machine is sufficient to achieve the requested torque with the planetary gear in the release position, and to determine a fuel consumption of the vehicle with the planetary gear in the release position and in the locked position, respectively, based on the first and the second operating parameters, wherein the control device is also adapted to, if the available torque from the combustion engine and the electrical machine is sufficient for the operation of the vehicle with the planetary gear in the release position, and if the vehicle's fuel consumption with the planetary gear in the release position is lower than in the locked position, set or keep the planetary gear in the release position, and control the electrical machine and the combustion engine in such a way that the requested torque is provided, while the planetary gear is in the release position, and while maintaining an engine speed of the combustion engine.

16. The drive system for a vehicle according to claim 15, wherein the drive system comprises means to control the engine speed of the combustion engine.

17. The drive system for a vehicle according to claim 15, wherein the drive system comprises means to control the torque of the electrical machine.

18. A computer program product for control of a drive system in a vehicle, wherein the drive system comprises a combustion engine with an output shaft, a gearbox with an input shaft, an electrical machine comprising a stator and a rotor, and a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of such third of said components, and wherein the drive system also comprises a first locking means, which may be moved between a locked position in which two of said components are locked together, so that the three components rotate at the same rotational speed, and a release position in which the components are allowed to rotate at different rotational speeds, wherein the computer program product is operated with a drive system which also comprises a second locking means, which that may be moved between a locked position in which the output shaft of the combustion engine is locked together with said first of said components, and a release position, in which the combustion engine's output shaft is disconnected from said first of said components and allowed to rotate independently of said first of said components, and in that the second locking means is kept in the locked position if the first locking means, is in the release position, wherein said computer program product is located on a non-transitory medium, which is readable by one or more computing devices, wherein the computer program code comprises instructions for operation by one or more computing devices to:

a) receive information about a requested torque for the operation of the vehicle, at least a first operating parameter of the combustion engine, and at least a second operating parameter of the electrical machine;

b) determine whether an available torque from the combustion engine and the electrical machine is sufficient to achieve the requested torque, with the planetary gear in the release position;

c) determine a fuel consumption of the vehicle with the planetary gear in a release position and in the locked position, respectively, based on the first and the second operating parameters; and d) if the available torque from the combustion engine and the electrical machine is sufficient to achieve the requested torque with the planetary gear in the release position, and if the vehicle's fuel consumption with the planetary gear in the release position is lower than in the locked position, set or keep the planetary gear in the release position, and control the electrical machine and the combustion engine in such a way that the requested torque is provided while the planetary gear is in the release position, otherwise set or keep the planetary gear in the locked position.

19. A vehicle comprising a drive system, the drive system comprising a combustion engine with an output shaft, a gearbox with an input shaft, an electrical machine comprising a stator and a rotor, and a planetary gear, which comprises three components in the form of a sun wheel, a ring gear and a planetary wheel carrier, wherein the output shaft of the combustion engine is connected with a first of said components in the planetary gear, so that a rotation of this shaft leads to a rotation of such first of said components, wherein the input shaft of the gearbox is connected with a second of said components in the planetary gear, so that a rotation of such shaft leads to a rotation of such second of said components, and wherein the rotor electrical machine is connected with a third of said components in the planetary gear, so that a rotation of the rotor leads to a rotation of such third of said components, and wherein the drive system also comprises a first locking means, which may be moved between a locked position in which two of said components are locked together, so that the three components rotate with the same rotational speed, and a release position in which the components are allowed to rotate at different rotational speeds, wherein the drive system comprises a second locking means, which may be moved between a locked position in which the output shaft of the combustion engine is locked together with said first of said components, and a release position, in which the combustion engine's output shaft is disconnected from said first of said components and allowed to rotate independently of said first of said components, and a control device adapted to receive information about a requested torque for operation of the vehicle, at least a first operating parameter of the combustion engine and at least one second operating parameter of the electrical machine, to control the second locking means, so that it is kept in its locked position if the first locking means is in its release position, to determine whether an available torque from the combustion engine and the electrical machine is sufficient to achieve the requested torque with the planetary gear in the release position, and to determine a fuel consumption of the vehicle with the planetary gear in the release position and in the locked position, respectively, based on the first and the second operating parameters, wherein the control device is also adapted to, if the available torque from the combustion engine and the electrical machine is sufficient for the operation of the vehicle with the planetary gear in the release position, and if the vehicle's fuel consumption with the planetary gear in the release position is lower than in the locked position, set or keep the planetary gear in the release position, and control the electrical machine and the combustion engine in such a way that the requested torque is provided, while the planetary gear is in the release position, and while maintaining an engine speed of the combustion engine.

* * * * *